United States Patent
McPherson et al.

(10) Patent No.: US 6,173,022 B1
(45) Date of Patent: Jan. 9, 2001

(54) SYNCHRONIZING AUDIO SIGNAL SAMPLES TAKEN AT DIFFERENT SAMPLING RATES

(75) Inventors: Alan McPherson, Burbank; Gregory Thagard, Encino, both of CA (US)

(73) Assignee: WEA Manufacturing, Inc., Olyphant, PA (US)

( * ) Notice: Under 35 U.S.C. 154(b), the term of this patent shall be extended for 0 days.

(21) Appl. No.: 09/066,041

(22) Filed: Apr. 24, 1998

Related U.S. Application Data

(60) Provisional application No. 60/045,598, filed on May 5, 1997, provisional application No. 60/045,599, filed on May 5, 1997, and provisional application No. 60/045,878, filed on May 5, 1997.

(51) Int. Cl.[7] .............................. H04L 7/00; G11B 20/20; H04H 5/00
(52) U.S. Cl. ............................ 375/355; 375/365; 360/26; 381/10
(58) Field of Search ...................... 375/355, 362, 375/363, 364, 365, 366, 368, 354, 225, 377; 360/48, 51, 39; 341/61, 50; 327/141, 144, 145; 369/49; 381/1, 2, 5, 10, 124; 386/99

(56) References Cited

U.S. PATENT DOCUMENTS

| | | | |
|---|---|---|---|
| 4,731,676 | * 3/1988 | Berlekamp | 360/26 |
| 5,136,650 | 8/1992 | Griesinger | 381/22 |
| 5,199,018 | * 3/1993 | Kim | 369/59 |
| 5,506,907 | 4/1996 | Ueno et al. | 381/18 |
| 5,539,716 | 7/1996 | Furuhashi | 369/59 |
| 5,638,451 | 6/1997 | Sedlmeyer | 381/2 |
| 5,844,513 | 12/1998 | Nishio | 341/143 |

FOREIGN PATENT DOCUMENTS

| | | | |
|---|---|---|---|
| 0 381 807 A2 | 8/1990 | (EP) | G11B/20/10 |
| 0 543 667 A1 | 5/1993 | (EP) | G11B/20/00 |
| 6-215483 | 8/1994 | (JP) | G11B/20/10 |
| WO 94/01980 | 1/1994 | (WO) | H04S/3/00 |
| WO 95/12274 | 5/1995 | (WO) | H04N/5/76 |
| WO 95/21491 | 8/1995 | (WO) | H03M/7/30 |

OTHER PUBLICATIONS

"Compact Disc mit gemultiplexten Informationskanalen", Neues aus der Technik.

* cited by examiner

*Primary Examiner*—Stephen Chin
*Assistant Examiner*—Betsy L. Deppe
(74) *Attorney, Agent, or Firm*—Fish & Neave; Robert R. Jackson; Joo-Youn Park

(57) ABSTRACT

Audio signal samples taken at different sampling rates are synchronized. A plurality of channels of audio data are sampled at different rates and recognizable synchronization data are added to selected samples of at least one channel of the plurality of channels.

14 Claims, 6 Drawing Sheets

| | |
|---|---|
| CHANNEL 1 DATA | RESOLUTION 1 |
| CHANNEL 2 DATA | RESOLUTION 2 |
| CHANNEL 3 DATA | RESOLUTION 3 |
| | |
| | |
| | |
| CHANNEL N DATA | RESOLUTION K |

SYNCHRONIZING AUDIO SIGNAL SAMPLES TAKEN AT DIFFERENT SAMPLING RATES

This application claims the benefit of U.S. provisional patent applications Nos. 60/045,598, 60/045,599, and 60/045,878, all filed May. 5, 1997.

BACKGROUND OF THE INVENTION

This invention relates to synchronizing audio signal samples taken at different sampling rates.

Commonly assigned McPherson et al. U.S. patent application Ser. No. 09/066,042, filed Apr. 24, 1998 and Thagard et al. U.S. patent application Ser. No. 09/066,043, filed Apr. 24, 1998 are incorporated herein by reference.

Technology of the type used for software carriers such as the Digital Versatile Disc ("DVD") makes it economically viable to provide recording media containing greatly enhanced audio information. For example, it is possible to provide digital audio recordings on such software carriers having multiple channels of digital audio to be played by six-channel audio systems. The typical multiple-channel audio system has a front left channel, a front center channel, a front right channel, a rear left channel, a rear right channel, and a subwoofer channel.

It is known that increased sampling rates provide better audio reproduction. However, sampling all channels of multi-channel audio at very high rates may produce more data and take up more space on the software carrier than is necessary to produce better reproduction. For example, the information in the front channels of six-channel audio tends to be more important than the information in the rear and subwoofer channels. It may therefore be adequate to sample only the front channels at the highest rate, while the rear and subwoofer channels are sampled at lower rates. This reduces the amount of data that needs to be stored on the software carrier (as compared to sampling all channels at a very high rate) and therefore saves space on the software carrier.

A possible problem with sampling different channels at different rates is that it increases the difficulty of maintaining synchronization and proper phasing between all the channels, especially when the data stream is modified for such purposes as editing and splicing different portions of the data stream together.

In view of the foregoing, it is an object of this invention to provide improved synchronization of audio signal samples taken at different sampling rates.

SUMMARY OF THE INVENTION

This and other objects of the invention are accomplished by providing methods and apparatus for synchronizing audio signal samples taken at different sampling rates whereby a plurality of channels of audio data are sampled at different rates and recognizable synchronization data are added to selected samples of at least one channel of the plurality of channels.

Further features of the invention, its nature and various advantages will be more apparent from the accompanying drawings and the following detailed description of the preferred embodiments.

BRIEF DESCRIPTION OF THE DRAWINGS

FIG. 1 is a chart of several data channels and corresponding resolutions;

DETAILED DESCRIPTION OF THE PREFERRED EMBODIMENTS

To enhance the listening experience beyond what is usually provided in conventional software carrier systems, software carriers may have some of the channels sampled at a sampling rate greater than has heretofore conventionally been used. For example, in a six-channel multi-channel system, the three front channels may be sampled at 88.2 or 96 KHz (176.4 or 196 KHz), which is higher than the 44.1 or 48 KHz rates conventionally used as the highest sampling rate. The rear channels, which generally contain somewhat less important information, may be sampled at the more conventional 44.1 or 48 KHz sampling rate. The subwoofer channel, which contains only low frequency information and which therefore does not need a high sampling rate, may be sampled at 11.025 or 12 KHz. It is wasteful of space on the recording media to sample all six channels at 88.2 or 96 KHz when the rear and subwoofer channels do not significantly benefit from such high sampling rates.

There are two families of sampling rates commonly used at present in the recording industry. The first family includes rates of 48, 96, and 192 KHz. The second family includes rates of 44.1, 88.2, and 176.4 KHz. At present, the highest rates in each family (192 KHz and 176.4 KHz) are only supported in stereo, not in any other multichannel format. Both families can be used with bit depths of 16, 20 and 24 bits.

The foregoing considerations lead to sampling the various channels to be recorded at different sampling rates.

Figure 2:
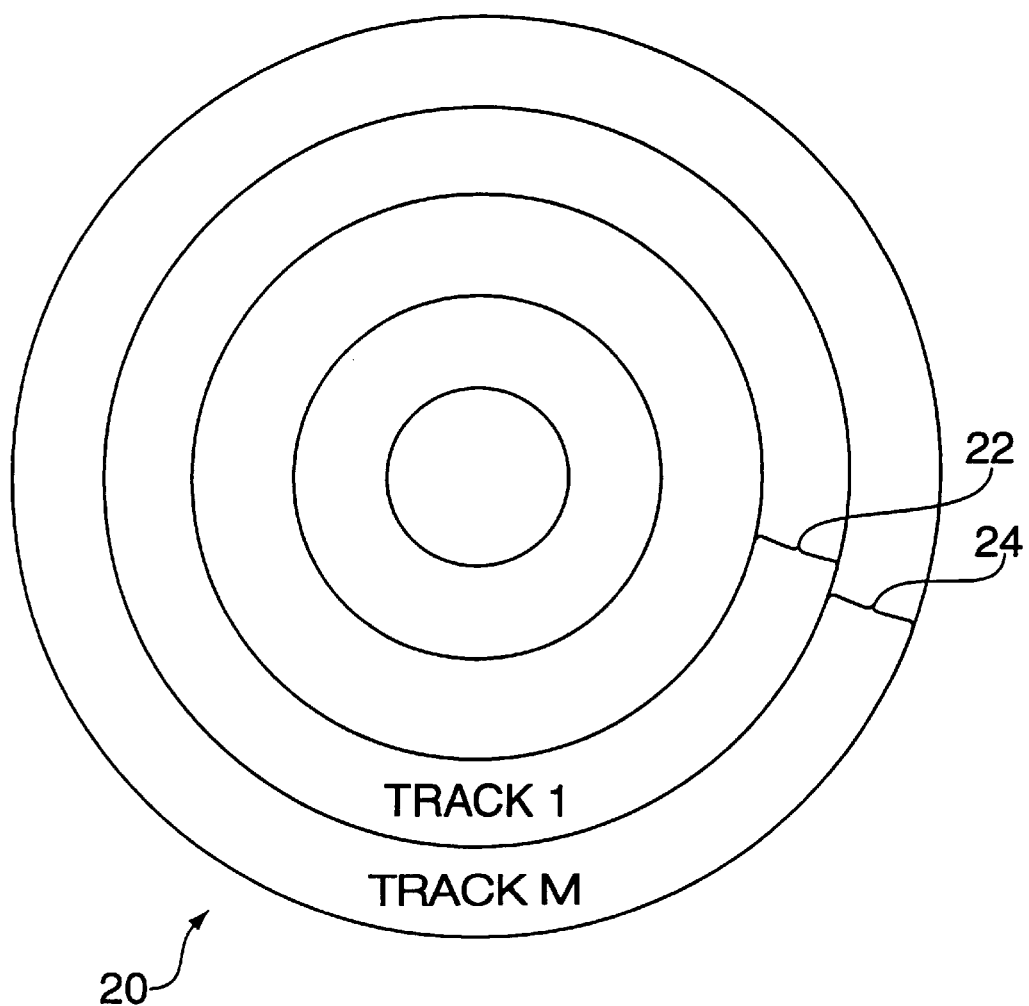
FIG. 2 is a simplified elevational view of a preferred software carrier.

As shown in FIG. 1, N channels of audio data (represented by numbers 12, 14, 16, and 18, for example) are provided on a software carrier 10 (such as DVD disc 20 in FIG. 2). N may include six channels for six-channel audio, two channels for two-channel audio, and/or any other number of channels for any other format(s) of the audio programming included on the software carrier. There can be any of K different resolutions used for the data in the various channels, where K is less than or equal to N. Each of the N channels can have its own resolution (in which case K equals N) or several channels can share the same resolution (in which case K is less than N).

As shown in FIG. 1, different resolutions correspond to different sampling rates and/or different sample word lengths (i.e., a greater resolution means a greater sampling frequency and/or a longer sample word length).

As shown in FIG. 2, channels 1–N may be provided in multiple tracks on a software carrier such as a DVD disc 20. For example, track 1 (which may include channels 1–I (e.g., six channels for six-channel audio) is labeled 22, and track M (which may include channels J–N (e.g., two channels for two-channel audio) is labeled 24. Several channels are typically provided in a single stream in each track, so that M is less than N. For example, when N=8, I=6, and M=2, track 1 includes channels 1–6 and track 2 includes channels 7 and 8.

There is a risk that data from several channels that are sampled at different data rates may inadvertently and undesirably shift in phase relative to one another during various manipulations of the data. Such manipulations may include editing of the information, subdividing the data into the successive sectors on the recording media, etc. Phase shifts between the channels can cause audible artifacts of the audio when it is played back. For example, an intended "location" of the audio can audibly shift left or right in an unacceptable fashion.

Figure 3:
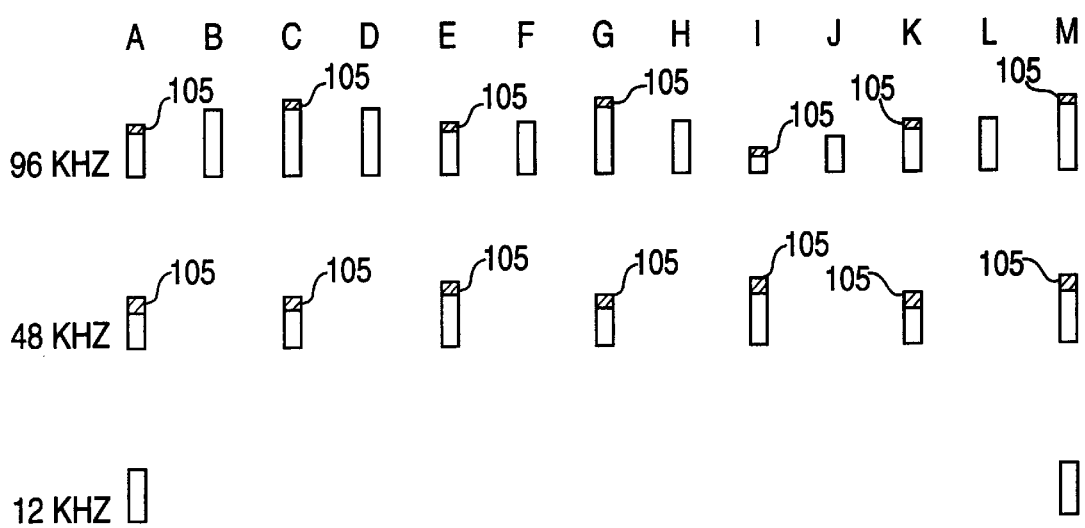
FIG. 3 is a simplified pulse train diagram showing illustrative trains of samples for three different channels taken at three different sampling rates with synchronization data added according to an embodiment of the present invention.

The present invention avoids problems of this kind by adding recognizable synchronization data to certain samples from various channels. For example, FIG. 3 shows trains of samples for three different channels taken at three different sampling rates: 96 KHz (uppermost sample train), 48 KHz (middle sample train), and 12 KHz (lowermost sample train). Recognizable synchronization data 105 is added to synchronized samples in the two higher frequency sample trains. In the particular example shown in FIG. 3 synchronization data is added to the 96 KHz and 48 KHz samples at sample times A, C, E, G, I, K, and M, etc. FIG. 3 does not show adding synchronization data to the 12 KHz samples because the frequency of the information contained in that channel tends to be low enough that it may not be necessary to guard against small phase shifts for that channel. However, synchronization data could be added to synchronized samples in all channels (e.g., at sample times A and M, etc.).

Synchronization data 105 may be used in any of a variety of ways during any of the various subsequent manipulations of the sample trains. For example, during editing of the information represented by the sample trains, it may be necessary to remove some samples from the various trains. Synchronization data 105 can be used to ensure that after samples have been removed from the 96 KHz and 48 KHz, sample trains initially synchronized samples in the two trains are still synchronized in the edited trains. This avoids the possibility that editing may inadvertently cause the 96 KHz and 48 KHz trains to shift by one sample time relative to one another.

Another example of a possible use of synchronization data 105 is to help ensure that when the samples are grouped for recording in successive sectors on software carriers, each sector begins with synchronized samples, at least from the 96 KHz and 48 KHz sample trains. This helps prevent unwanted phase shifts between the 96 KHz and 48 KHz sample groups during playback of the recorded information.

Figure 4:
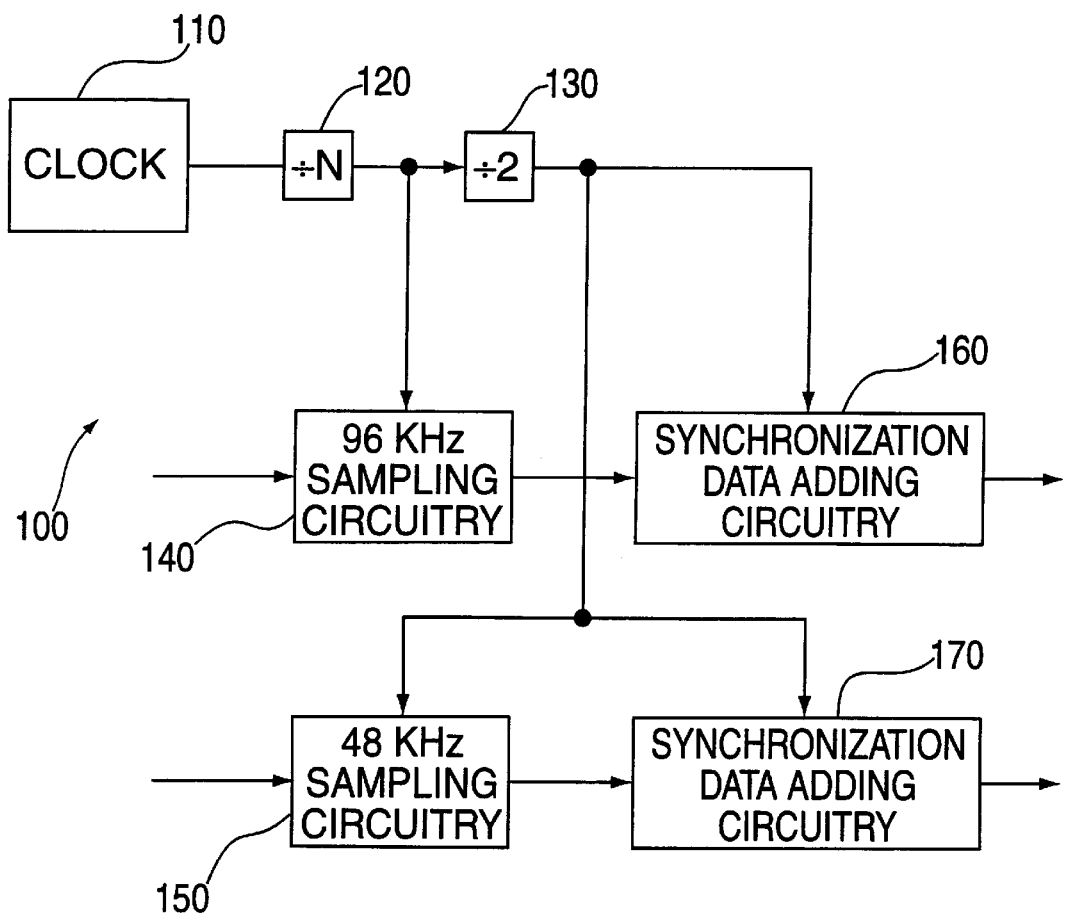
FIG. 4 is a simplified block diagram showing an illustrative embodiment of an apparatus according to the present invention.

Synchronization data 105 can be added to synchronized samples in any suitable way. Illustrative apparatus 100 for accomplishing this is shown in FIG. 4. One high speed clock 110 controls sampling in both the 96 KHz channel and the 48 KHz channel. The clock signal produced by clock 110 is divided by N in divider 120 to produce a reference signal at 96 KHz. This 96 KHz reference signal is applied to 96 KHz sampling circuitry 140 to control sampling in the 96 KHz channel. The output signal of divider 120 is further divided by 2 in divider 130 to produce a reference signal at 48 KHz. This 48 KHz reference signal is applied to 48 KHz sampling circuitry 150 to control sampling in the 48 KHz channel. The 48 KHz reference signal from divider 130 is also applied to synchronization data adding circuits 160 and 170 so that synchronization data 105 is added to synchronized samples in both the 96 KHz and 48 KHz channels as shown in FIG. 3.

Figure 5:
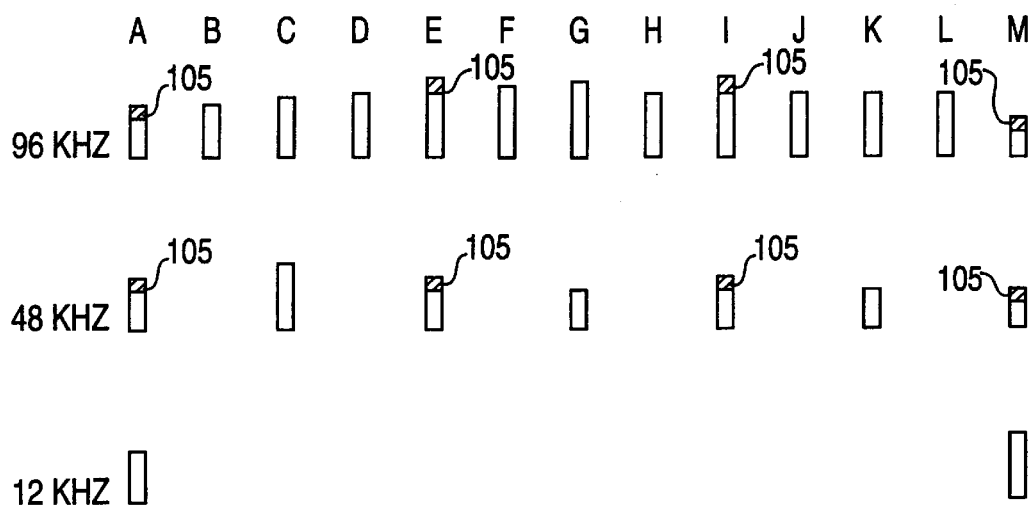
FIGS. 5 and 6 are diagrams similar to FIG. 3 showing other illustrative trains of samples for three different channels taken at three different sampling rates with synchronization data added according to two different embodiments of the present invention.
Figure 6:
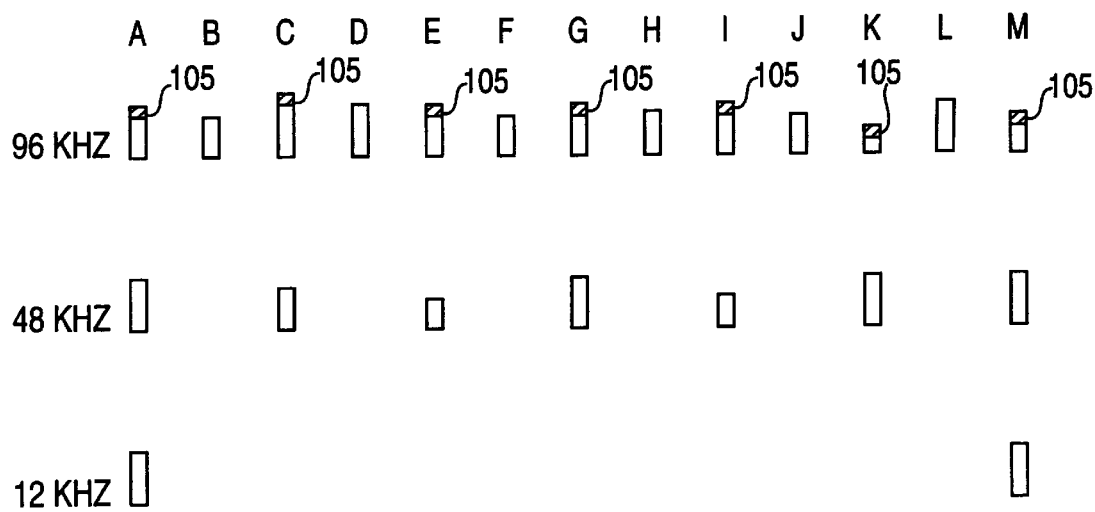

The particular frequencies mentioned herein are only illustrative and other frequencies can be used in the various channels as desired. For example, the three sample trains shown in FIG. 3 could be at 88.2, 44.1, and 11.025 KHz, respectively, if desired. The frequency with which synchronization data is added to samples may also be different from what is shown in FIG. 3. For example, instead of adding synchronization data to every other sample in the 96 KHz sample train as shown in FIG. 1, such data could be added to every fourth sample in that train (see FIG. 5). Synchronization data would then also be added in synchronized fashion to every other sample in the 48 KHz sample train. As another alternative, in the example shown in FIG. 3 it may be sufficient to add synchronization data 105 only to every other one of the samples in the 96 KHz sample train (i.e., to the 96 KHz samples that are concurrent with 48 KHz samples) (see FIG. 6). Synchronization data 105 may not be needed in the 48 KHz samples in a situation (as in FIG. 6) in which every 48 KHz sample would receive such data.

Figure 7:
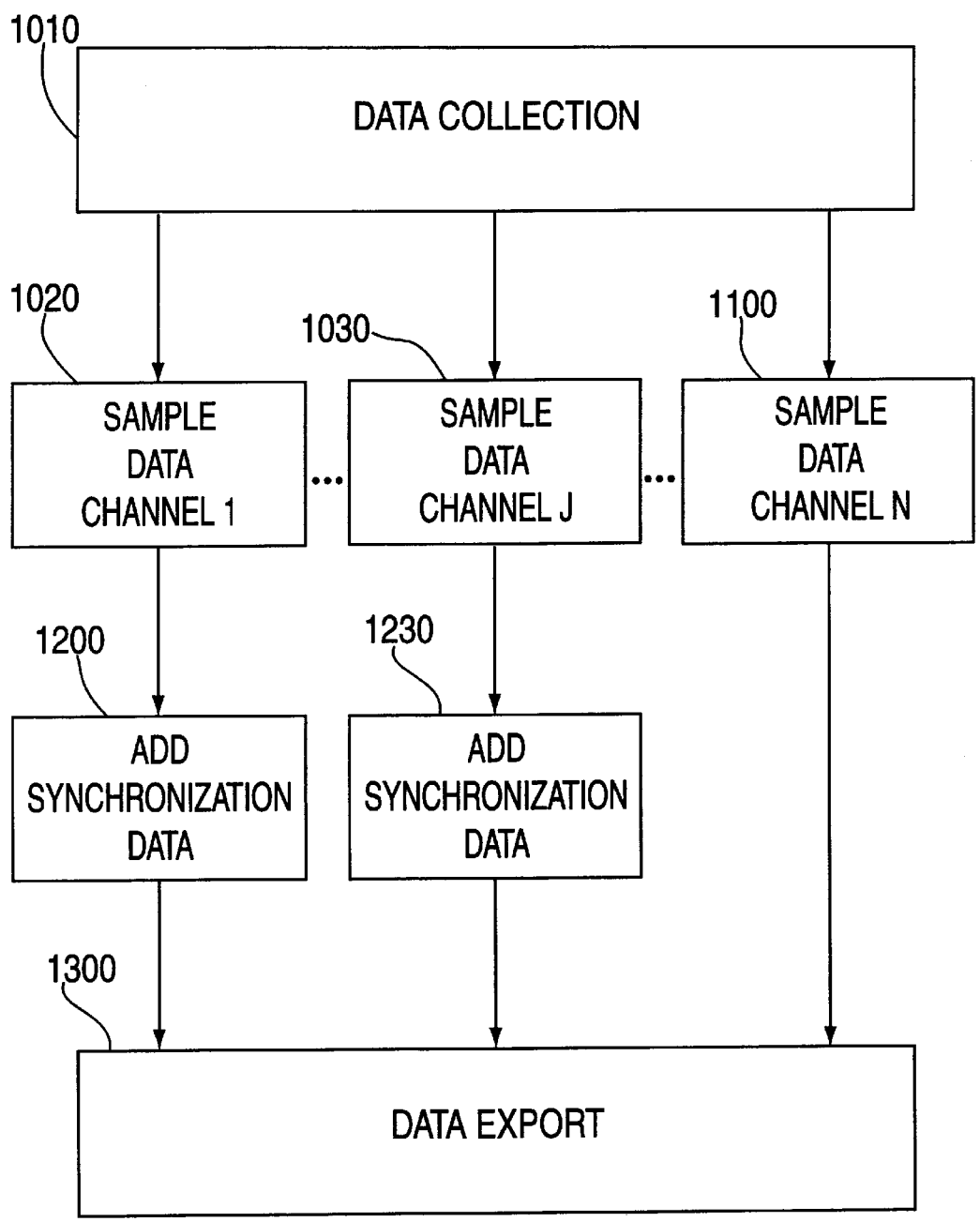
FIG. 7 is a flow chart of an illustrative embodiment of a method according to the present invention.

FIG. 7 is a flow chart of an illustrative embodiment of a method according to the present invention. In step 1010, audio data is collected. In steps 1020 through 1100 (there are N such steps), the audio data from step 1010 is separated into different channels and sampled at at least two different sampling rates. In steps 1200 through 1230 (there are J such steps, where J is less than or equal to N), synchronization data is added to selected samples. The spacing between samples in a particular channel to which synchronization data is added is determined according to a known function. In step 1300, the sampled audio data including synchronization data is exported to a suitable storage medium or output device.

It will be understood that the foregoing is only illustrative of the principles of this invention, and that various modifications can be made by those skilled in the art without departing from the scope and spirit of the invention.

The invention claimed is:

1. A method for synchronizing audio signal samples comprising:

sampling a plurality of channels of audio data such that at least two channels of said plurality of channels are sampled at different rates; and adding recognizable synchronization data to selected samples of at least one channel of said plurality of channels.

2. The method of claim 1 wherein said adding comprises adding at regular intervals recognizable synchronization data to selected samples of at least one channel of said plurality of channels, wherein the intervals between said selected samples is determined according to a known function.

3. The method of claim 2 wherein said known function is a periodically repeating function.

4. The method of claim 1 wherein said selected samples comprise at least half of all samples of at least one channel of said plurality of channels.

5. The method of claim 1 wherein said different rates include a highest rate and a lowest rate, and wherein said adding comprises adding recognizable synchronization data to selected samples of at least one channel of said plurality of channels that has been sampled at the highest rate.

6. The method of claim 1 wherein said adding comprises adding recognizable synchronization data to selected samples of two or more channels of said plurality of channels sampled at the highest rates.

7. The method of claim 1 wherein said adding comprises adding recognizable synchronization data to selected samples of a first channel of said plurality of channels such that said selected samples are concurrent with samples from a second channel of said plurality of channels, wherein said first channel is sampled at a first sampling rate and said second channel is sampled at a second sampling rate that is lower than said first sampling rate.

8. An apparatus for synchronizing audio signal samples comprising:

sampling circuitry for sampling a plurality of channels of audio data such that at least two channels of said plurality of channels are sampled at different rates; and a synchronization data adding circuit for adding recognizable synchronization data to selected samples of at least one channel of said plurality of channels.

9. The apparatus of claim 8 wherein said synchronization data adding circuit adds at regular intervals recognizable synchronization data to selected samples of at least one channel of said plurality of channels, wherein the intervals between said selected samples is determined according to a known function.

10. The apparatus of claim 9 wherein said known function is a periodically repeating function.

11. The apparatus of claim 8 wherein said selected samples comprise at least half of all samples of at least one channel of said plurality of channels.

12. The apparatus of claim 8 wherein said different rates include a highest rate and a lowest rate, and wherein said synchronization data adding circuit adds recognizable synchronization data to selected samples of at least one channel of said plurality of channels that has been sampled at the highest rate.

13. The apparatus of claim 8 wherein said synchronization data adding circuit adds recognizable synchronization data to selected samples of two or more channels of said plurality of channels sampled at the highest rates.

14. The apparatus of claim 8 wherein said synchronization data adding circuit adds recognizable synchronization data to selected samples of a first channel of said plurality of channels such that said selected samples are concurrent with samples from a second channel of said plurality of channels, wherein said first channel is sampled at a first samDling rate and said second channel is sampled at a second sampling rate that is lower than said first sampling rate.

* * * * *